Patented Jan. 28, 1941

2,229,665

UNITED STATES PATENT OFFICE 2,229,665

PREPARATION OF ALKYL KETALS FROM MERCAPTOLES AND ALCOHOLS

Walter Edwin Mochel, Wilmington, Del., assignor to E. I. du Pont de Nemours & Company, Wilmington, Del., a corporation of Delaware No Drawing. Application August 14, 1939, Serial No. 290,027

12 Claims. (Cl. 260—615)

This invention relates to the preparation of organic compounds and more particularly to the preparation of ketals.

Ketals are diethers of a special type which can be hydrolyzed to ketones. Ketals have hitherto been prepared 1. Directly from ketones and alcohols—a few activated ketones can be condensed with alcohols.
2. From orthoformic esters and ketones—a convenient method for small quantities but relatively expensive.
3. From imino ethers and ketones—a method both inconvenient and expensive.
4. From orthosilicates and ketones—a method rather expensive and quite inconvenient.
5. From dialkyl sulfites and ketones—an expensive process.
6. From acetylenes and alcohols—a process having the disadvantage that the proper acetylenes are not readily available.
7. From certain halogen-containing compounds and metal alcoholates—a process which is quite expensive and not very general.
8. By addition of alcohol to unsaturated ethers—a process which is disadvantageous in that the ethers are not readily available.

This invention has as an object the provision of a process, of general application, for the convenient, economical and practical preparation of ketals. A further object is the preparation of the corresponding enol ethers. Other objects will appear hereinafter.

These objects are accomplished by the following invention wherein a mercaptole, preferably an aliphatic saturated mercaptole, is reacted with an alcohol, preferably an aliphatic alcohol of not more than ten carbon atoms, in the presence of an acidic interchange catalyst. The result of this reaction is the gradual evolution of the mercaptan, which usually is removed by distillation as it is produced, causing the formation of the ketal corresponding to the ketone and alcohol employed. The ketal or its corresponding enol ether can then be isolated from the reaction mixture. The ketal is most saisfactorily obtained by distilling the reaction mixture after the acid catalyst has been completely neutralized, while the enol ether, obtained by the loss of a molecule of alcohol from the ketal, is isolated by distilling the reaction mixture without neutralizing the acid catalyst.

In the process of the invention, mercaptoles and alcohols are reacted together in the presence of an interchange catalyst of acid reaction to form the mercaptan and the ketal, which may be isolated as such or as the corresponding enol ether. The required mercaptoles are formed by reacting a mercaptan with a ketone in the presence of a catalyst of acid reaction (such as hydrogen chloride, sulfuric acid, etc.) as indicated in the following equation.

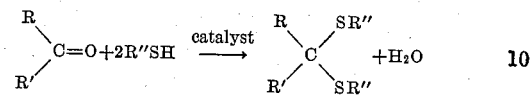

In the present invention, the mercaptole formed thus, or in any other way, is treated with an alcohol in the presence of an acid reacting catalyst to form the ketal, as indicated in the following equation:

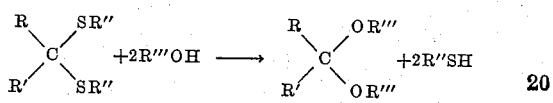

The mercaptan may be recovered and used again in the first step.

In the preferred practice of this invention, a mixture of a mercaptole, an alcohol, and a catalyst is placed in a vessel, connected with an efficient fractionation column, and heating is commenced. The temperature at the top of the column soon becomes that of the boiling point of the mercaptan (about 35° C. for ethyl mercaptan), and the mercaptan is gradually removed at such a rate that distillation continues at this temperature during most of the process. However, when most of the mercaptole has been removed the temperature gradually increases. The product usually is isolated by distillation after the acid catalyst has been neutralized by the addition of a basic material. Variations from this preferred procedure will be mentioned later. The process of this application is an equilibrium reaction which goes to completion only if one of the components of the equilibrium mixture is removed. It is therefore essential, in order to obtain the best yields, that the process be conducted so as to remove one of the components.

The more detailed practice of the invention is illustrated by the following examples, wherein parts given are by weight. There are of course many forms of the invention other than these specific embodiments.

Example I

Substantially dry hydrogen chloride is passed into a mixture of 7,280 parts of ethyl mercaptan and 4,220 parts of methyl ethyl ketone until the solution becomes saturated with the gas. The aqueous layer which has separated weighs 1,387 parts. The organic layer is thoroughly washed with aqueous sodium hydroxide solution (5–10% concentration), with water, and dried over calcium chloride. The mercaptole (2,2-bis(ethylthio)butane) weighs 9,600 parts, amounting to a 92.5% yield. It can be further purified by distillation, preferably under reduced pressure. Other catalysts of acid reaction may be used with, or instead of, the hydrogen chloride.

A mixture of 178 parts of 2,2-bis(ethylthio)butane, 395 parts of anhydrous methanol, and 8 parts of p-toluenesulfonic acid is heated and the ethyl mercaptan removed in the course of 3.5 hours by distillation through an efficient column. The temperature of distillation gradually rises from 34 to 40° C. while the first 118 parts of the mercaptan fraction is being removed, and from 40 to 55° C. while the remaining 15 parts of this fraction is removed. The mercaptan fraction weighs 133 parts, as compared with the theoretical quantity of 124 parts, and is shown by analysis to contain about 86% of mercaptan. The residue in the distillation flask is then made basic with sodium methylate, and the material is distilled at about 150 mm., leaving a small amount of unreacted mercaptole. The distillate weighs 422 parts, and is shown by analysis to contain about 25% by weight of 2,2-dimethoxybutane, the balance being methyl alcohol. This corresponds to a 91.4% yield of the ketal.

In this example, the ketal is not isolated in a pure state, but for convenience is obtained as a solution in methyl alcohol. However, it can be isolated as a pure material or in more concentrated solution as indicated below.

A solution (1550 parts) of 2,2-dimethoxybutane in methyl alcohol (28% ketal) is treated with 50 parts of dry mercuric chloride to remove a small amount of sulfur-containing material from the solution. The white precipitate is removed, and the solution made slightly alkaline by the addition of sodium methylate. The material is then carefully distilled through an efficient column. The first fraction consists of a mixture of methanol and the ketal (about 18% ketal), and finally there is obtained 147 parts of 2,2-dimethoxybutane. Redistillation gives the pure ketal; B. P. 106–7° C., $n^{25}=1.3920$. By discontinuing the fractionation at an earlier stage, it is possible to obtain mixtures of ketal and methanol of almost any desired concentration.

A solution (1800 parts) of 2,2-dimethoxybutane in methyl alcohol (25% ketal) and 1485 parts of benzene is distilled at atmospheric pressure through an efficient column. The first fraction consists of a mixture of methyl alcohol and benzene, and then there is obtained a mixture (625 parts) of the ketal in methanol. This is shown by analysis to contain about 60% by weight of the ketal. By this process it is possible to obtain mixtures of ketals in methanol (or other material) of any desired concentration, and pure ketal can be obtained by the addition of sufficient benzene to remove all the alcohol.

Example II

A mixture of 178 parts of 2,2-bis(ethylthio)-butane, 128 parts of methyl alcohol, and 3 parts dry hydrogen chloride is heated at reflux temperature and the mercaptan is gradually removed as it is formed. After 14 hours 119 parts of mercaptan has been removed. The residue is made slightly alkaline with sodium methylate, and separated into four fractions by distillation. The methanol fraction consists of 98 parts and is collected in the range of 40 to 65° C. The column is then placed under 100 mm. pressure and a fraction is taken off at 50–1° C. This fraction of 58 parts is mainly 2,2-dimethoxybutane, $n^{31}=1.3878$, $n^{28}=1.3899$. Then a fraction (14 parts is obtained at 93–102° C., and perhaps is 2-methoxy-2-ethylthiobutane since it contains some sulfur. Further treatment of this high boiling fraction with an alcohol and a catalyst causes the liberation of an additional quantity of mercaptan. The last fraction consists of the residue in the distillation flask and is unreacted mercaptole, and it also reacts further with an additional quantity of alcohol.

Example III

A mixture of 534 parts of 2,2-bis(ethylthio)butane, 384 parts of methanol, and 18 parts of anhydrous hydrogen chloride is heated at reflux temperature until 366 parts of mercaptan has been evolved. Distillation at atmospheric pressure of the acidic residue gives a fraction (264 parts) boiling at 40–65° C., largely methanol, a fraction of 2 parts at 65–85° C., a fraction of 194 parts at 85–90° C., and a residue of 84 parts. The fraction boiling at 85–90° C. is 2-methoxybutene-1, probably obtained by the loss of alcohol from the corresponding ketal. The enol ether is formed in this variation of the process because the distillation is of an acidic distilland. The enol ether can be converted into the ketal by treatment with alcohol in the presence of an acidic catalyst.

In the above examples, the reactants are all present at the start of the process. However, it also is possible to add certain of the materials to the reaction mixture during the course of the reaction; the following example shows a method by which this can be done.

Example IV

A mixture of 80 parts of methanol, 90 parts of 2,2-bis(ethylthio)butane, and 15 parts of p-toluenesulfonic acid is heated and the mixture of alcohol, mercaptan, and ketal is slowly removed by distillation while a solution of 112 parts of methanol and 89 parts of the mercaptole is gradually added to the vessel. When most of this material has been distilled, an additional 374 parts of methanol is added and distillation is continued until the temperature reaches 70° C. The residue in the flask weighs 51 parts and contains 36 parts of unchanged mercaptole. The distillate is redistilled through an efficient column and gives 118 parts of mercaptan fraction boiling at 35–40° C., an intermediate fraction of 33 parts at 40–63° C., and 488 parts boiling at 63–5° C. This last material is shown by analysis to contain 11.7% by weight of 2,2-dimethoxybutane.

In the above examples the mercaptan of the mercaptole is ethyl mercaptan. However, mercaptoles of other mercaptans can be used, although the methods of isolating the ketals are dependent on the materials employed. The change in the mercaptole causes changes in the corresponding mercaptole and the method of isolation of the ketal may be correspondingly varied. Thus, in the following example, the ketal being the more volatile component, is distilled off in the process leaving the mercaptan behind.

Example V

The mercaptole of methyl ethyl ketone and cyclohexanethiol is prepared by passing hydrogen chloride into a mixture of the two materials. A mixture of 160 parts of this mercaptole, 110 parts of anhydrous methanol, and 8.1 parts of p-toluene-sulfonic acid is heated in a reaction vessel of suitable design, and the mixture of ketal and methanol is slowly removed by distillation. After 2½ hours an additional 100 parts of methanol is added and distillation is continued until the temperature reaches 70° C. The distillate (65° C.) is redistilled through a good column to give a methanol solution of 2,2-di-methoxybutane. The material remaining in the reaction vessel comprises the liberated mercaptan and some unchanged mercaptole and may be fractionally distilled to separate its components.

In the process of the present invention, any mercaptole may be reacted with any alcohol in the presence of any acidic interchange catalyst, i. e., interchange catalyst of acid reaction.

Thus, the mercaptole is of the formula

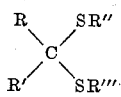

wherein each of R, R', and R'', and R''' may be any monovalent organic radical, aliphatic, cycloaliphatic, aromatic heterocyclic, including alkyl, aryl, aralkyl and alicyclic, saturated and unsaturated, R and R' may be joined together as in cyclohexanone. The mercaptole is preferably derived from monofunctional saturated, low molecular weight ketones and mercaptans. Thus, the mercaptole may be the derivative of any of the following ketones: acetone, dipropyl ketone, methyl propyl ketone, diethyl ketone, acetophenone, methyl benzyl ketone, cyclohexanone, cyclopentanone, with any of the following mercaptans: propyl, cyclohexyl, methyl, butyl, and other alkyl mercaptans, thiophenol, benzyl mercaptan, etc.

These mercaptoles can, in general, be easily made by reacting the mercaptan and the ketone in approximately stoichiometric ratios in the presence of a catalyst of acid reaction, such as hydrogen chloride, sulfuric acid, zinc chloride, etc. The mercaptole can then most conveniently be purified by washing thoroughly with basic reacting materials, such as aqueous sodium hydroxide, and then by water, and finally be dried by an anhydrous salt ($CaCl_2$, etc.) or other means. The mercaptoles thus obtained can, if desired, be further purified by distillation or other means.

As above indicated, the mercaptole obtained as above or in any other suitable manner, may be reacted with any alcohol including those having the formula $R^{IV}OH$, wherein $R^{IV}$ is a monovalent aliphatic, alicyclic, heterocyclic, or aralphatic radical. Thus, there may be used methyl, ethyl and other aliphatic alcohols, benzyl and other aromatic alcohols, cyclohexyl and other alicyclic alcohols, furfuryl and other heterocyclic alcohols, ethylene glycol and the polyhydric alcohols. Most satisfactory results are obtained when the alcohol is a monohydric, saturated, straight chain alcohol of relatively low molecular weight, i. e., containing not more than ten carbon atoms. Mixtures of alcohols may be used.

The amount of alcohol used in this invention can be varied quite greatly. Although stoichiometric quantities of materials (mercaptole and alcohol) can be employed, the reaction usually is quite slow under those conditions, and it is desirable to use a considerable excess of the alcohol. For example, the reaction between methanol and 2,2-bis(ethylthio)butane can be carried out quite satisfactorily by using about twice the theoretical quantity of the alcohol, although the time of reaction is greatly reduced by using a larger quantity of the alcohol. However, it is not advisable to use too large an excess of the alcohol because of the difficulty encountered in separating the ketal from the excess alcohol. Consequently, for most purposes, it is preferred to use from one to ten times the amount of alcohol theoretically required for interchange with the mercaptole.

Any interchange catalyst of acid reaction can be employed, including strong inorganic acids, e. g., various acids of sulfur, phosphorus, and chlorine, boron trifluoride and its complexes with other compounds, relatively strong organic acids, e. g., aromatic and aliphatic sulfonic acids, chloroacetic acid, etc., salts of acid reaction, as zinc, tin and aluminum chlorides, heteropoly acids, i. e., acids containing an oxide of phosphorus, silicon, boron, or arsenic coordinated with other groups, such as the oxides of tungsten, vanadium, chromium, molybdenum, tellurium, sulfur, etc. The preferred catalysts are hydrogen chloride, sulfuric acid, zinc chloride, and p-toluenesulfonic acid. The quantity of catalyst employed in the reactions can be varied greatly, and the amount is best determined by experimental means. In general, from 0.1 to 5% of the total charge can be catalyst, although the quantity can be either larger or smaller.

The interchange reaction of this invention can most satisfactorily be carried out in a vessel on which is mounted an efficient fractionating column to effect the separation of the mercaptan from the reaction mixture and for distillation of the product. However, any apparatus by which the results of this invention can be achieved can be employed.

The method in which the interchange process is carried out can be varied, depending mainly on the physical characteristics of the components of the reaction mixture. Thus, if the mercaptan is the lowest boiling material present in the reaction, it can be separated from the balance of the mixture by distillation. However, if the mercaptan should be the highest boiling material, the excess alcohol and the ketal can be removed from the mercaptan by distillation. In general, the process will of necessity be dependent on the nature of the materials used in the interchange process. The interchange reaction need not be carried out to completion, but can be interrupted at any point and the ketal can be removed from the unreacted mercaptole.

The ketal can be isolated in various ways, as already has been indicated above. Examples have been given for concentrating solutions of a ketal in alcohol by removing the alcohol by distillation, or by removing it as a mixture (probably an azeotropic binary) by the aid of benzene or other materials. The ketal can be removed from the reaction mixture either before or after neutralizing the acid catalyst, although it is preferable when the ketal rather than the enol ether is desired first to neutralize the acid catalyst in order to prevent formation of the enol ether from the ketal by the loss of a molecule of alcohol. It is more convenient to remove the mercaptan by distillation, then add a basic material, such as sodium methylate, to neutralize the acid catalyst, and then distill the ketal and alcohol together, leaving behind any unreacted mercaptole. For some purposes the solution of ketal in alcohol can be used in this form. However, in order to obtain the pure ketal or a more concentrated solution of the ketal in alcohol, one of the previously mentioned processes can be employed. It is possible, also, to remove the alcohol by adding the mixture of ketal and alcohol to water, although precautions must always be taken to maintain a basic solution in order to prevent hydrolysis of the ketal. Any process of isolating the product is consistent with the nature of the invention.

Due to the ease with which ketals are hydrolyzed by water in the presence of acids, it is necessary to maintain practically anhydrous systems whenever acids are present in the presence of ketal. Proper precautions must be observed to exclude moisture.

The amount of ketal present in solutions of ketals in alcohols may be determined quantitatively by an analytical procedure based on that of Iddles and Jackson, Ind. Eng. Chem. (Anal.) 6, 454 (1934), in which the ketones are nearly quantitatively precipitated as derivatives of 2,4-dinitrophenyl-hydrazine. The concentrations of the solution may also be determined from their refractive indices.

A very small amount of sulfur-containing material may be present in the product. This usually can be removed by careful distillation, or by conversion to salts, and then the product can be distilled. Various heavy metal salts, such as mercuric chloride, lead chloride, zinc chloride, etc. can be used for this purpose. Also, any remaining mercaptan can be removed by the formation of the corresponding mercaptide by the addition of sodium methylate, etc.

In order to obtain the ketal substantially free from enol ether, it is desirable to neutralize the acid-reacting catalyst used in the interchange process before the ketal is isolated. This can most conveniently be done by adding inorganic materials of basic reaction, such as sodium carbonate, calcium oxide, etc. However, these materials usually cause the undesirable formation of some water and, consequently, it is preferable to add materials such as metal alcoholates (sodium methylate, etc.) or strong organic bases, which produce no water during the neutralization process.

(1) The interconversion of ketals and unsaturated ethers seems to occur according to the following equation:

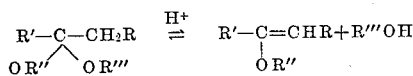

Thus, a pure ketal heated in the presence of an acid catalyst breaks down into the ether and alcohol, and the equilibrium is shifted in the desired direction by removing the lower boiling of these materials. The reverse reaction is achieved merely by adding a little acid to a mixture of the ether and alcohol. Consequently, either product can be obtained depending on the means chosen for isolating the product. First, it appears necessary to use an acid catalyst for removing the mercaptan. If the product is then obtained by distillation from the acidic mass, the unsaturated ether is obtained. However, the conversion to the ether does not seem to be quantitative because at least some of the ketal seems to distill with the excess of alcohol even when the mixture is still acidic. However, if the mass is made basic by neutralization of the acid catalyst, the shift from the ketal to the ether is prevented, and the product consists practically wholly of the ketal. Thus, while the process is of primary interest for the preparation of ketals, it is equally applicable for obtaining unsaturated ethers.

In Examples IV and V as contrasted with Example III, no substantial amount of enol ether is obtained because a large excess of alcohol is distilled with the ketal, the equilibrium being then shifted to the ketal side. Therefore, the conditions to get the enol ether should be (1) presence of acid; (2) absence of substantial amounts of alcohol.

(2) The reactions are all conveniently carried out at the reflux temperature of the lowest boiling component. Thus, when ethyl mercaptan is evolved, the bath is about 100° C., the reaction mixture is about 65° C. when methanol is used, and the top of the column is about 35° C. Ordinarily atmospheric pressure is used, although higher pressures may be used though without any appreciable difference in result.

The present invention is of value in that it affords a convenient and economical method for the manufacture of ketals which are of use in many ways, e. g., for the production of unsaturated ethers, and for the preparation of polyvinyl ketals. Previously available methods for the production of ketals, e. g., those outlined above, are not applicable to commercial practice and the process of the present invention is therefore of great utility. The materials required for its practice are inexpensive and are easily obtained, and the operations are not difficult to perform.

The above description and examples are intended to be illustrative only. Any modification of or variation therefrom which conforms to the spirit of the invention is intended to be included within the scope of the claims.

What is claimed is:
1. Process for the preparation of a member of the class consisting of ketals and the corresponding enol ethers which comprises reacting a mercaptole with an alcohol in the presence of an acidic interchange catalyst.
2. Process as in claim 1, wherein the more volatile product in the reaction mixture is removed from the reaction mixture as it forms.
3. Process for the preparation of a member of the class consisting of ketals and the corresponding enol ethers which comprises reacting a mercaptole with an alcohol of not more than ten carbon atoms in the presence of an acidic interchange catalyst.
4. Process as in claim 3, wherein the more volatile product in the reaction mixture is removed from the reaction mixture as it forms.
5. Process for the preparation of a member of the class consisting of ketals and the corresponding enol ethers which comprises reacting a mercaptole with an aliphatic alcohol of not more than ten carbon atoms in the presence of an acidic interchange catalyst.
6. Process as in claim 5, wherein the more volatile product in the reaction mixture is removed from the reaction mixture as it forms.
7. Process for the preparation of a member of the class consisting of ketals and the corresponding enol ethers which comprises reacting an aliphatic mercaptole with an aliphatic alcohol of not more than ten carbon atoms in the presence of an acidic interchange catalyst.
8. Process as in claim 7, wherein the more volatile product in the reaction mixture is removed from the reaction mixture as it forms.
9. Process for preparing enol ethers which comprises reacting a mercaptole with an alcohol in the presence of an acidic interchange catalyst, removing the alcohol by distillation, then heating the product in the presence of acid under essentially anhydrous conditions and removing the enol ether.

10. Process as in claim 9, wherein the more volatile product in the reaction mixture is removed from the reaction mixture as it forms.

11. Process for preparing ketals which comprises heating a mercaptole with an alcohol in the presence of an acidic interchange catalyst, neutralizing the acidic interchange catalyst with a base, preferably one which does not yield water on reacting with the catalyst, and isolating the ketal.

12. Process as in claim 11, wherein the more volatile product in the reaction mixture is removed from the reaction mixture as it forms.

WALTER EDWIN MOCHEL.